Patented July 28, 1925.

1,547,189

UNITED STATES PATENT OFFICE.

CHARLES A. WILSON, OF TORRANCE, CALIFORNIA, ASSIGNOR OF ONE-HALF TO JAMES B. GOCKE, OF LOS ANGELES, CALIFORNIA.

METHOD OF CEMENTING OFF OIL WELLS.

No Drawing.  Application filed April 17, 1924. Serial No. 707,294.

*To all whom it may concern:*

Be it known that I, CHARLES A. WILSON, a citizen of the United States, residing at Torrance, in the county of Los Angeles and State of California, have invented new and useful Improvements in Methods of Cementing Off Oil Wells, of which the following is a specification.

My invention relates to a method of cementing off oil wells in which a quick setting hydraulic cement composition which is especially adapted and intended for the shutting off of water in oil wells is used. The common practice in shutting off water in oil wells is to make a mixture of water and Portland cement capable of being pumped and apply the same to the bottom of the well, or wherever it is desired to shut off the water. The cement mixture will surround the bottom of the casing on the outside, and form also a plug on the inside of the casing. After the same has hardened, the inside plug is drilled through and the water in the water stratum is cemented off.

Owing to the large quantities of water encountered in many of the cementing off jobs, and the natural flow of the water, which in many cases contains sulphur and arsenic compounds and also carbonic acid gas, all of which re-agents are detrimental to the cement, so that there is not always sufficient time for the cement to harden properly, the cementing off job is often unsuccessful and has to be repeated, causing great expense and delay in drilling the well.

It has therefore been an endeavor of the oil industry to use a quickly setting cement, so as to prevent the dilution of the cement mixture by the water and effect the proper shutting off of the water.

It is an object of this invention to form a cement mixture, which, depending upon the proportions of the ingredients used, may be caused to harden and set very quickly, the time of hardening ranging from a few minutes to several days.

My invention consists in the method of cementing off oil wells hereinafter described and claimed.

I take a hydraulic cement, such as Portland cement, and mix the same with a solution of sodium silicate and water to form a mixture capable of being pumped.

One gallon of sodium silicate to a ton of cement will cause the cement to harden in about three days; two gallons per ton in twenty-four hours; three gallons per ton in two to three hours; four gallons per ton in about five minutes.

The water required to form a cement mixture capable of being pumped is about forty gallons of water to one ton of cement, although the quantity of water will vary somewhat, depending upon the quality of the cement.

In place of sodium silicate, potassium silicate may be used, but sodium silicate will naturally be preferred, on account of its lower cost.

I am aware that sodium silicate has been used before with Portland cement, in combination with other ingredients, such as oil or silica, but these additional ingredients interfere with the quick setting of the cement.

My invention consists of the use of sodium silicate alone with Portland cement. The sodium silicate seems to form a protective coating for each particle of cement, and prevents the water surrounding the mixture, when pumped into place where it is to be used, from interfering with the proper hardening of the cement.

I claim:

1. A method of cementing off oil wells, comprising forming a mixture of Portland cement, sodium silicate and water of a consistency capable of being pumped, and pumping the mixture into an oil well for shutting off water.

2. A method of cementing off oil wells, comprising forming a mixture of Portland cement, alkali metal silicate and water of a consistency capable of being pumped and pumping the mixture into an oil well for shutting off water.

In testimony whereof I have signed my name to this specification.

C. A. WILSON.